United States Patent

Ohsawa

[15] 3,705,313

[45] Dec. 5, 1972

[54] TRANSISTOR CIRCUIT PERFORMING GATING OPERATION

[72] Inventor: Mitsuo Ohsawa, Fujisawa, Japan

[73] Assignee: Sony Corporation, Tokyo, Japan

[22] Filed: June 7, 1971

[21] Appl. No.: 150,441

[30] Foreign Application Priority Data

June 9, 1970 Japan ....................45/49604
June 9, 1970 Japan ....................45/49605
June 12, 1970 Japan ....................45/50825

[52] U.S. Cl. ....................307/239, 307/240
[51] Int. Cl. ....................H03k 17/56
[58] Field of Search ....................307/253, 239, 240, 244; 328/99, 100

[56] References Cited

UNITED STATES PATENTS 3,551,703 12/1970 Bischoff ....................328/99
3,061,671 10/1962 Waller ....................328/99

*Primary Examiner*—James W. Lawrence
*Assistant Examiner*—Harold A. Dixon
*Attorney*—Lewis H. Eslinger, Alvin Sinderbrand and Curtis, Morris & Safford

[57] ABSTRACT

In a signal gating circuit in which a switching transistor provides a shunt path for the input signal when switched to its conductive condition by the application of a gating signal thereto, the transistor is biased to be completely inactive when in its nonconductive condition, whereby to avoid any distortions in the intermittently gated signal regardless of the nature of the input signal. The signal gating circuit is suitable for fabrication as an integrated circuit, and may be embodied in modulator or demodulator circuits.

10 Claims, 6 Drawing Figures

INVENTOR.
MITSUO OHSAWA
BY
Lewis H. Eslinger

INVENTOR
MITSUO OHSAWA
BY
Lewis H. Eslinger

INVENTOR.
MITSUO OHSAWA
BY
Lewis H. Eslinger

INVENTOR

BY MITSUO OHSAWA

Lewis H. Eslinger

TRANSISTOR CIRCUIT PERFORMING GATING OPERATION

This invention relates generally to signal gating circuits, and more particularly is directed to improvements in signal gating circuits of the type that employ a switching transistor providing a shunt path for the input signal when switched to its conductive condition by the application of a gating signal thereto.

In a signal transmitting system, a gating circuit for intermittently gating a continuous signal may be employed to modulate a carrier signal of a predetermined constant frequency and amplitude with a certain signal, or to demodulate a modulated signal. A gating circuit proposed for this purpose, employs a transistor, for example, an NPN-type transistor, connected between the output terminal of a signal source generating a continuous signal and ground, with the emitter of the transistor being at the side of ground. A gating signal is supplied to the base of the transistor to turn it on and off intermittently and, when the transistor is in its on state or conductive condition, the signal from the signal source is by-passed or shunted to ground through the collector and emitter of the transistor. Thus, only when the transistor is in its off state or nonconductive condition, is the signal from the signal source derived at the collector. With such an arrangement, however, in the event that the signal from the signal source is negative when the transistor is in its off state, its collector potential is lower than the base potential to turn on a diode formed between the base and collector to decrease the impedance therebetween. By reason of the foregoing, the signal derived at the collector is made small to present a suppressed wave form with resulting asymmetrical distortion of the output signal.

Accordingly, it is an object of this invention to provide a transistor circuit which performs a gating operation to transmit a signal intermittently without causing distortions in the waveform of the output signal.

Another object is to provide a transistor circuit performing a gating operation to transmit a signal intermittently and which is suitable for fabrication in the form of an integrated circuit.

Still another object of this invention is to provide a modulator or demodulator circuit which comprises a transistor circuit operative to gate a signal intermittently without distortions in the waveform of the gated signal and which is suitable for fabrication in the form of an integrated circuit.

In accordance with an aspect of this invention a signal gating circuit is provided with a switching transistor which affords a shunt path for the input signal when the transistor is switched to its on state or conductive condition under the control of a gating signal, and the transistor is biased to be completely inactive when in its nonconductive condition, whereby to avoid any distortions in the gated output signal regardless of the nature of the input signal which is to be gated.

The above, and other objects, features and advantages of the invention will be apparent from the following detailed description of illustrative embodiments which is to be read in connection with the accompanying drawings, wherein.

Figure 1:
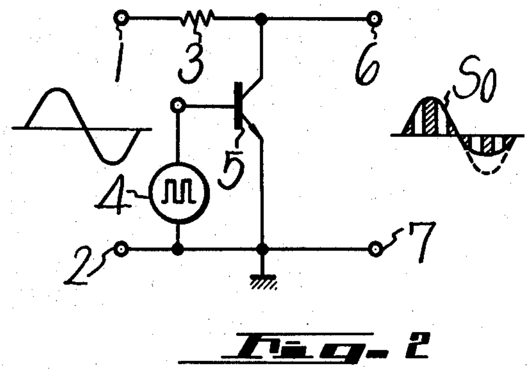
Fig. 1 PRIOR ART
FIG. 1 is a connection diagram showing a conventional gating circuit.

For a better understanding of this invention, a conventional gating circuit will be described with reference to FIG. 1.

The conventional gating circuit is shown to comprise a resistor 3 and a switching transistor 5 connected in series with signal supply terminals 1 and 2. Output terminals 6 and 7 are respectively connected to the connection point between resistor 3 and switching transistor 5 and to one of the signal supply terminals, for example, the terminal 2 on the ground side. A gating signal source 4, for example, generating a rectangular wave, is connected to the base of switching transistor 5, whereby an output signal $S_o$ which is intermittently cut off by the gating signal is obtained at output terminals 6 and 7.

However, in the event that the switching transistor 5 is of the NPN-type, as shown, the collector potential of transistor 5 is lower than its base potential when a negative potential appears at terminal 1, so that a diode formed between the base and collector is rendered conductive, resulting in asymmetrical distortion of the waveform of the output signal $S_o$ with the peak value at its negative side being suppressed.

Figure 2:
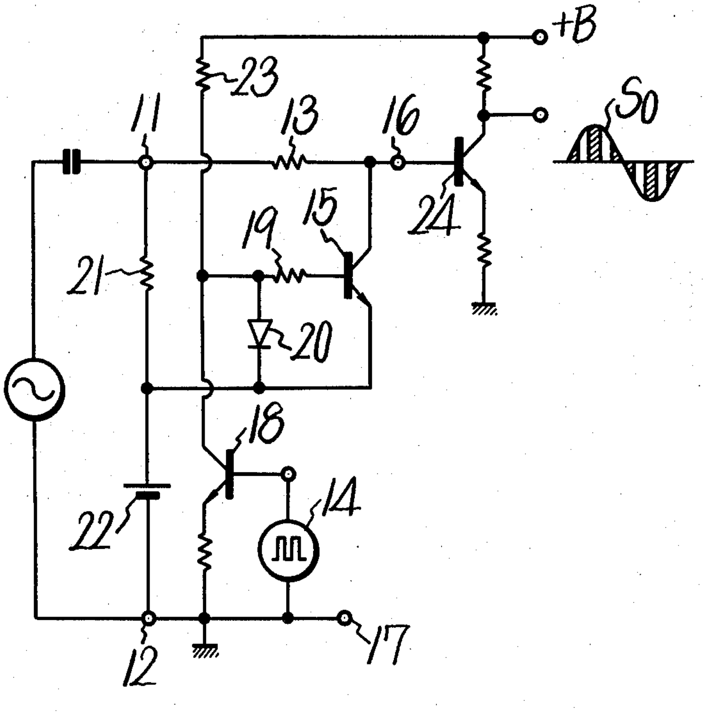
FIG. 2 is a connection diagram illustrating a gating circuit according to one embodiment of this invention.

Referring now to FIG. 2, the manner in which the present invention prevents such asymmetrical distortion will now be described. In the embodiment of FIG. 2, series circuit of a resistor 13, a switching transistor 15 and a bias source 22 is connected between signal supply terminals 11 and 12 and the base of the switching transistor 15 is connected to the terminal 12 through a transistor 18, the base of which is, in turn, connected to a gating signal source 14 producing a gating signal. Output terminals 16 and 17 are respectively connected to the collector of transistor 15 and to terminal 12. When switching transistor 15 is of the NPN-type, the negative electrode of bias source 22 is grounded and its positive electrode is connected to the emitter of switching transistor 15. Further, the positive electrode of bias source 22 is connected to input terminal 11 through a resistor 21. The base of transistor 15 is supplied with a bias voltage from a positive power source +B through resistors 23 and 19. A diode 20 is connected between the base and emitter of transistor 15 through the resistor 19 and is arranged in the direction as to permit conduction of the bias voltage. The base current of transistor 15 is made constant by the conduction of diode 20. The switching transistor 15 is turned on when transistor 18 is in its off state.

It is preferred that the internal impedance of bias source 22 be almost zero, and that the resistance of resistor 13 be relatively high, for example, about 10 kilohms.

With the above arrangement, when switching transistor 15 is in its on state, no input signal is supplied between the output terminals 16 and 17 and, when switching transistor 15 is in its off state, a potential corresponding to that of the input signal appears between output terminals 16 and 17.

When the input signal passes through the circuit, that is, when the transistor 15 is in its off state, the collector of transistor 15 is supplied with a predetermined potential by way of resistors 13 and 21 from bias source 22 and the base potential of the transistor 15 is made substantially equal to the ground potential by the conduction of transistor 18. Therefore, the base potential is biased lower than he collector potential, so that the transistor 15 can be completely inactive to avoid generation of asymmetrical distortion in the gated output $S_0$ obtained at output terminals 16 and 17.

A transistor 24 may be connected to output terminal 16, as shown, to act as an amplifying transistor. Further the resistor 21 connected in parallel with the series circuit of resistor 13 and transistor 15 holds the collector and emitter of transistor 15 substantially equipotential to each other and prevents grounding of the input signal through bias source 22. By holding the collector and emitter of switching transistor 15 at the same potential as above, generation in the gated output of an offset voltage based on the nonconduction of transistor 15 can be prevented, and it is also possible that, when the input signal between input terminals 11 and 12 is zero, the gated output between output terminals 16 and 17 can be reduced completely to zero. That is, carrier leakage can e prevented.

Further, in accordance with the present invention, a drive circuit of small internal impedance is provided to supply a bias voltage to a gating circuit as above described. For example, in FIG. 3, reference character A indicates the gating circuit previously described with reference to FIG. 2 and reference character B indicates a drive circuit for supplying the gating circuit A with a bias voltage. The drive circuit B is made up of a transistor 25 held in a constant biased condition by a Zener diode 29, transistors 26 and 27 adapted to derive a base bias from the emitter of transistor 25 and a transistor 28 connected in series to the transistor 26 and supplied with a constant bias from any one of the series connection points between diodes 30, 31 and 32, for example, from the connection point between the diodes 30 and 31, as shown.

The transistor 25,26 and 27 are of the emitter follower type with their bases held in a constant biased condition and a bias voltage is supplied between input terminals 11 and 12 of gating circuit A from the emitters of transistors 26 and 27. Further, a terminal 33 is connected to the base of the transistor 26 and is supplied with the input signal which is to be intermittently gated.

With the described arrangement, the output impedance of drive circuit B at terminals 11 and 12 can be made sufficiently low to ensure that the gating ratio of the gating circuit A is very large. Further, the base biases of transistors 26 and 27 are derived from the emitter of the common transistor 25 and bias voltages are applied between input terminals 11 and 12 from the emitters of transistors 26 and 27. Consequently, the DC potentials at terminals 11 and 12 can be made substantially equal to each other to cause no potential difference to arise between the collector and emitter of switching transistor 15, whereby it is possible to prevent generation of the offset voltage between output terminals 16 and 17 of gating circuit A.

Figures 3, 6:
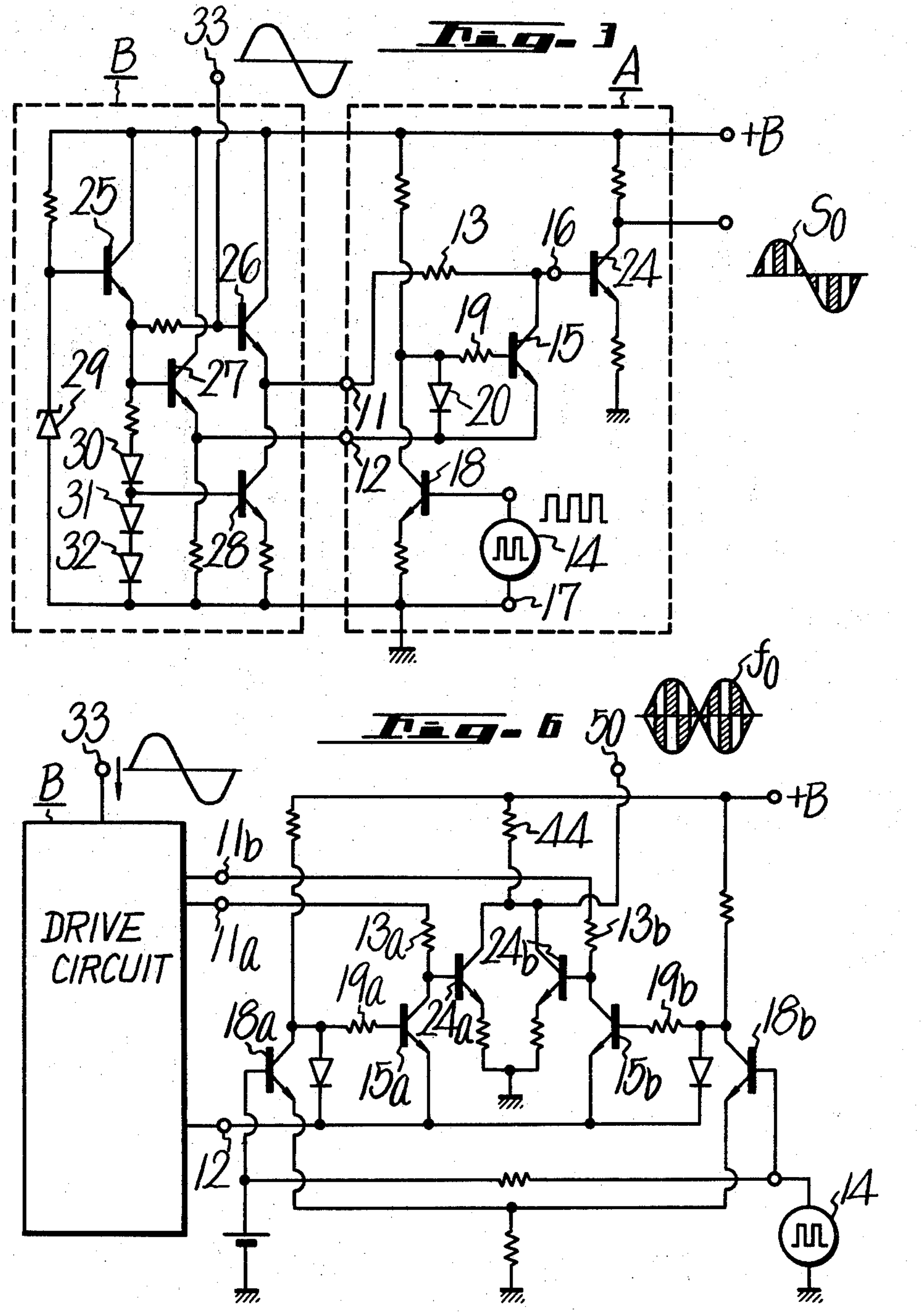
FIG. 3 is a connection diagram showing the gating circuit of FIG. 2 and a drive circuit therefor.
FIG. 6 is a connection diagram showing a balance modulator or demodulator circuit employing the gating circuit of FIG. 2.
Figure 4:
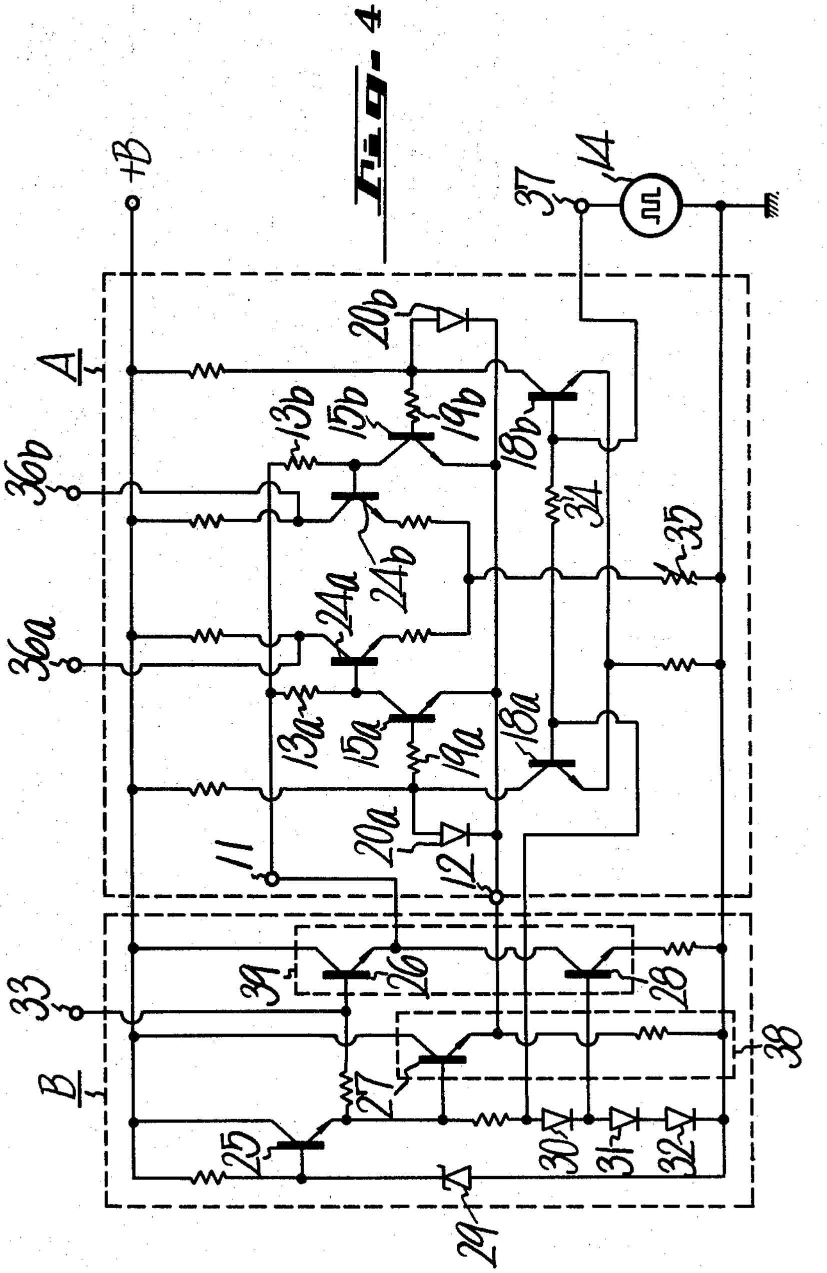
FIGS. 4 and 5 are connection diagrams illustrating FM stereo demodulator circuits employing the gating circuit of FIG. 2.

A balanced modulator or like circuit of excellent characteristics can be provided based on the gating circuit according to this invention, for example, as shown on FIG. 4. In the illustrated modulator, reference character A designates a gating section and reference character B designated the drive circuit of FIG. 3 which supplies substantially the same voltages between the collectors and emitters of switching transistors 15*a* and 15*b* of two gating circuits in the gating section A.

The two gating circuits of section A are each similar to the gating circuit previously described and are adapted to be intermittently controlled one after the other for balanced modulation, phase detection, synchronous detection or the like.

The illustrated embodiment of the present invention will be described as being applied to an FM stereo demodulator circuit, in which a stereo composite signal is applied to an input terminal 33 and left and right signals are derived from output terminals 36*a* and 36*b*.

An input terminal 37 receives a gating signal of 38 KHz which is applied to transistor 18*b*. Transistor 18*b* together with a transistor 18*a* make up a differential amplifier and signals of opposite phases are derived from the collectors of transistors 18*a* and 18*b*. The gating signal is blocked by a resistor 34 and, therefore, is not applied to transistor 18*a*. The gating signal is fed to the bases of the pair of switching transistors 15*a* and 15*b*. The switching transistors 15*a* and 15*b* are respectively connected through input terminals 12 and 11 and resistors 13*a* and 13*b* to bias sources 38 and 39 having transistors 27 and 26, by which the voltages across the series circuits constituted by resistor 13*a* and transistor 15*a*, and by resistor 13*b* and transistor 15*b*, respectively, are made substantially equal to each other.

Thus, switching transistors 15*a* and 15*b* are alternately turned on and off by transistors 18*a* and 18*b* making up the differential amplifier to provide demodulated stereo signals at the connection points of transistors 15*a* and 15*b* and resistors 13*a* and 13*b*, respectively. Transistors 24*a* and 24*b* constitute a differential amplifier amplifying the demodulated stereo signal and their collectors are connected to output terminals 36*a* and 36*b*. By adjusting a variable resistor 35 which is inserted in the emitter circuits of transistors 24*a* and 24*b*, the separation of the left and right signals can be adjusted.

With the FM stereo demodulator circuit made up of two gating circuits according to this invention, as shown on FIG. 4, neither asymmetrical distortion nor offset output are produced, and thus it is possible to obtain demodulated stereo signals without carrier leakage.

Figure 5:
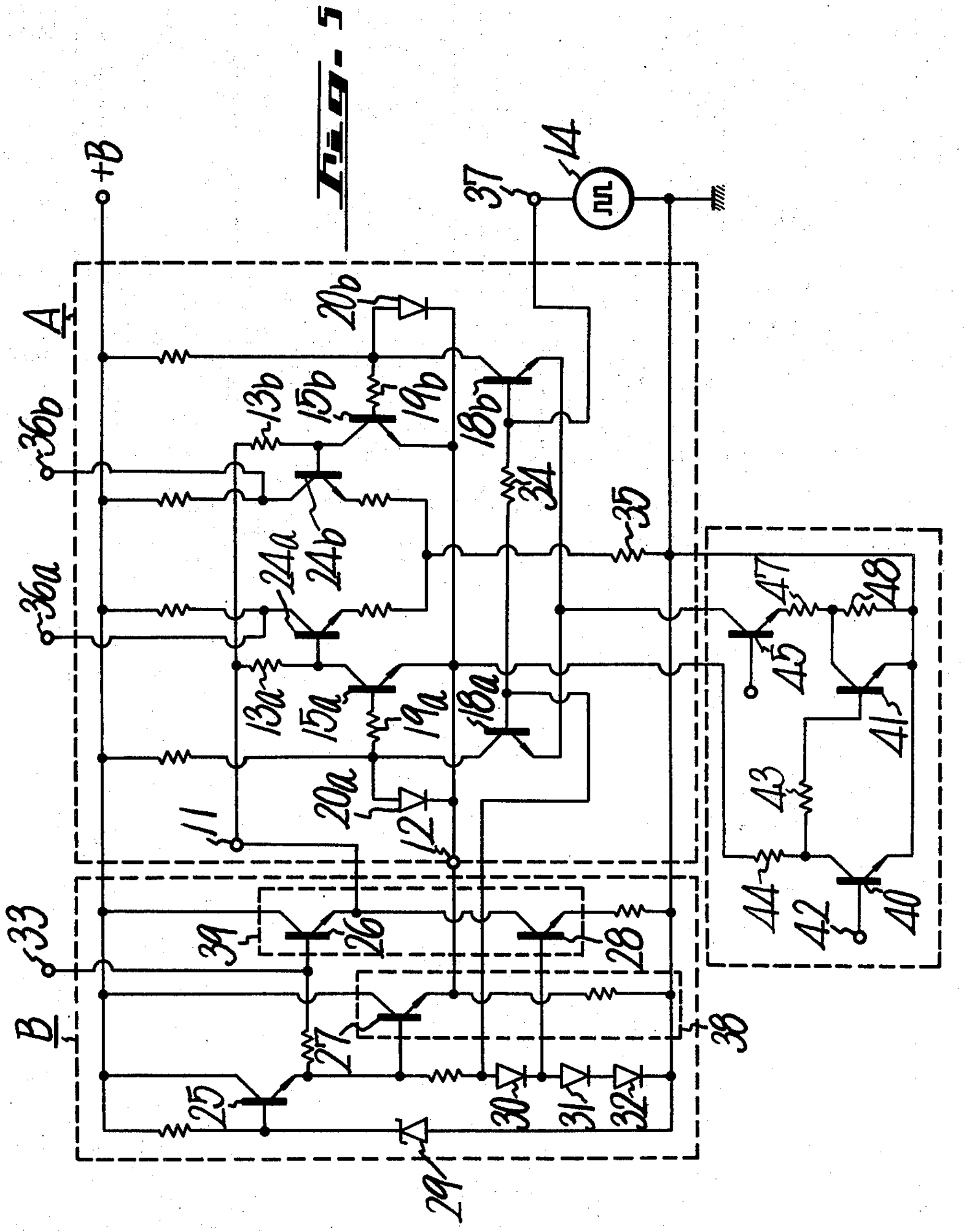

FIG. 5 illustrates a modification of the stereo demodulator circuit shown in FIG. 4, which is capable of muting operation. In the circuit of FIG. 5, the emitters of transistors 18*a* and 18*b* making up the differential amplifier are both grounded through a constant current source, for example, through a transistor 45 and a series circuit of resistors 47 and 48 connected in series therewith, as shown. The transistors 18*a* and 18*b* constituting the differential amplifier are turned on and off for them muting operation by means of transistors 40 and 41 employed as switching elements.

The transistor 40 has its base connected to a terminal 42 and its collector connected to the base of the transistor 41 through a resistor 43, while the transistor 41 has its collector connected to the connection point of the resistors 47 and 48 and the emitters of the transistors 40 and 41 are both grounded. The terminal 42 is supplied with a muting control signal for turning on the transistor 40 at the time of detuning.

Further, the emitters of transistors 15*a* and 15*b* are connected through a resistor 44 to the collector of transistor 40 so as to prevent fluctuation of the DC potentials at the output terminals 36*a* and 36*b* in the course of muting operation.

The operation of the circuit shown in FIG. 5 is as follows: When a receiver is receiving a stereo broadcast, no muting signal is applied to the terminal 42, so that transistor 40 is in its off state and transistor 41 is in its on state, and accordingly transistor 45 is also in its on state. Consequently, transistors 18*a* and 18*b* constituting the differential amplifier are turned on and off in opposite phases by a switching signal derived from terminal 37 and left and right signals demodulated in the same manner as in the case of FIG. 4 are derived at terminals 36*a* and 36*b*.

However, in the case of detuning, a muting signal is applied to terminal 42 to turn on transistor 40 and turn off transistor 41, and hence to also turn off transistor 45. Therefore, transistors 18*a* and 18*b* making up the differential amplifier are turned off, and as a result switching transistors 15*a* and 15*b* are both switched on. Therefore, the signal is blocked and no outputs are derived at output terminals 36*a* and 36*b*, so that the muting operation is achieved.

Although the invention has been described above as being applied to an FM stereo demodulator circuit, the invention is also applicable to balanced modulator or demodulator circuits. For example, FIG. 6 illustrates a balanced modulator or demodulator circuit embodying this invention in which the emitters of the transistors 24*a* and 24*b* supplied with signals derived at the connection points of the switching transistor 15*a* and the resistor 13*a* and of the transistor 15*b* and the resistor 13*b*, respectively, are grounded and the collectors of the transistors 24*a* and 24*b* are connected in common. A load resistor 49 is connected between the common connection and a power source +B and the connection point of the collectors of the transistors 24*a* and 24*b* is connected to an output terminal 50. In this case, when signals of opposite phases are supplied between the input terminals 11*a* and 11*b* and 12, respectively, a balanced modulated signal $f_0$ or demodulated signal is derived at the output terminal 50.

As will be apparent from the foregoing, the present invention provides a gating circuit which neither generates asymmetrical distortion nor produces the offset output voltage, and such gating circuit may be employed in a balanced modulator, demodulator or FM stereo demodulator which causes neither distortion nor carrier leadage. The modulator and demodulator free of carrier leakage are of great utility. Further, the gating circuit according to the invention is made up of transistors of the same type and does not employ any inductance element or capacitor, so that it is very suitable to be made in the form of an integrated circuit.

Although the gating circuit according to this invention has been specifically described in a balanced modulator, demodulator or FM stereo demodulator, it will be readily understood that such gating circuit may be used as a phase modulator and demodulator, frequency mixer or synchronous detector.

Although specific embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. A transistor circuit for performing a gating operation, comprising signal transmitting means for transmitting a signal from an input terminal to an output terminal, signal shunting means connected to said transmitting means between said input and output terminals and including at least a first switching transistor having a collector, emitter and base and through which a shunt path for the input signal is provided when said first switching transistor is in its on state, signal source means providing a gating signal, transistor control means receiving said gating signal and selectively conditioning said first switching transistor in said on state and in the off state thereof in correspondence with said gating signal, and bias voltage applying means applying bias voltages to both said collector and emitter of said first switching transistor to ensure that said transistor is completely inactive when in said off state.

2. A transistor circuit according to claim 1, in which said bias voltages applied to said collector and emitter, respectively, of the first switching transistor have the same potential.

3. A transistor circuit according to claim 1, in which said bias voltage applying means has two terminals respectively connected to said collector and emitter of the first switching transistor and at which the same DC voltages appear.

4. A transistor circuit according to claim 1, in which said transmitting means includes impedance means between said input and output terminals, and said shunting means is connected to said transmitting means between said impedance means and said output terminal.

5. A transistor circuit according to claim 1, in which said transistor control means includes a second switching transistor connected to said first switching transistor to condition the latter in said on and off states thereof in response to said second switching transistor being in its off and on states, respectively, said off and on states of said second switching transistor being controlled by said gating signal.

6. A transistor circuit according to claim 5, in which said first and second switching transistors are of the same type, the collector-emitter path of said first switching transistor defines said shunt path when said first switching transistor is in said on state, means apply a bias voltate to the base of said first switching transistor for conditioning the latter in said on state, the collector-emitter path of said second switching transistor is connected between said base of the first switching transistor and ground so as to remove the bias voltage from said base of the first switching transistor and turn the latter to its off state when said second switching transistor is in its on state, and said signal source means is connected to the base of said second switching transistor for turning the latter to its on state upon the occurrence of said gating signal.

7. A transistor combination circuit comprising an input terminal receiving a composite stereophonic sound signal; a pair of transistor circuits each performing a gating operation and each including signal transmitting means for transmitting said signal from said input terminal to a respective output terminal and signal shunting means connected to said transmitting means between said input terminal and said respective output terminal and having switching transistor means operative to form a shunt path for gating the signal in the respective transmitting means; signal source means for applying a gating signal to said shunting means of each of said transistor circuits and thereby causing said pair of transistor circuits to alternately perform a gating operation in response to said gating signal with separated right and left sound signals being obtained at the respective output terminals of the transmitting means of said pair of transistor circuits, and means for applying a bias voltage to said switching transistor means of each of said transistor circuits so as to cause each of said switching transistor means to be in an inactive state except when made operative in response to said gating signal.

8. A transistor combination circuit according to claim 8 in which said switching transistor means of each of said transistor circuits includes at least a first transistor having a collector and emitter between which the respective shunt path is formed when said first transistor is in its on state, and said means for applying a bias voltage applies substantially the same voltage to said collector and emitter of said first transistor.

9. A transistor combination circuit according to claim 7, further comprising switching circuit means for muting the signals in said transmitting means in response to a muting signal supplied thereto.

10. A transistor combination circuit according to claim 9, in which said switching circuit means is connected in common to both of said pair of transistor circuits performing the gating operation.

* * * * *